M. A. DUQUETTE.
WEIGHING SCALE.
APPLICATION FILED MAY 18, 1906.
1,072,589.
Patented Sept. 9, 1913.
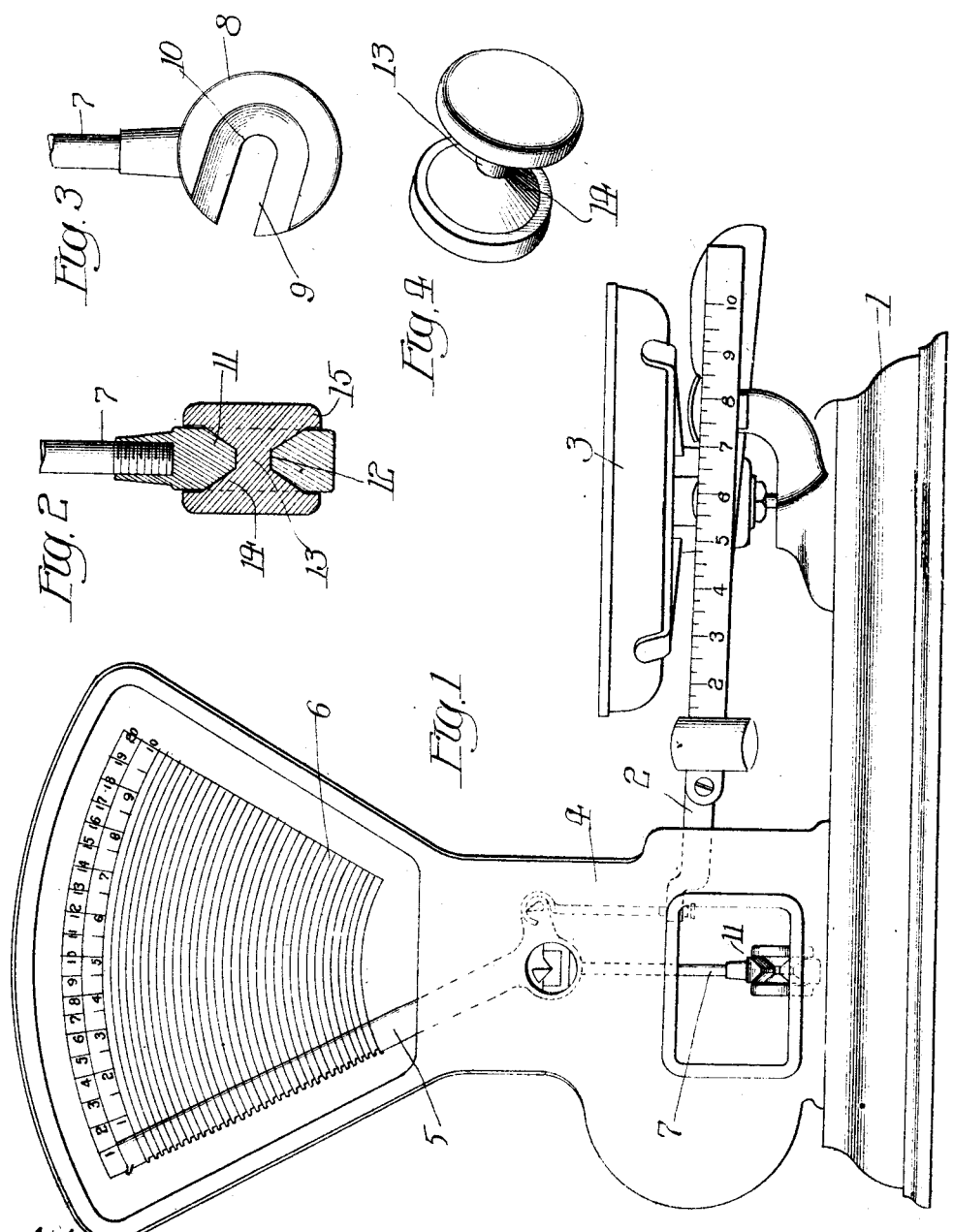

UNITED STATES PATENT OFFICE.

MAXIM A. DUQUETTE, OF TOLEDO, OHIO, ASSIGNOR TO TOLEDO SCALE COMPANY, OF TOLEDO, OHIO, A CORPORATION OF NEW JERSEY.

WEIGHING-SCALE.

1,072,589. Specification of Letters Patent. Patented Sept. 9, 1913.

Application filed May 18, 1906. Serial No. 317,490.

*To all whom it may concern:*

Be it known that I, MAXIM A. DUQUETTE, a citizen of the United States, residing at Toledo, in the county of Lucas and State of Ohio, have invented certain new and useful Improvements in Weighing-Scales, of which the following is a specification.

The present invention relates to weighing scales of the pendulum type, such, for example, as disclosed in De Vilbiss Reissue Patent No. 12,029, dated September 9, 1902, and, while not necessarily confined to computing scales, is nevertheless primarily intended for employment therein. In such scales it is customary to vary the weighing and computing capacity by changing the load on the pendulum and this is commonly accomplished by placing an additional weight or "ball" as it is called upon the pendulum so as to increase the counter-balancing effect thereof.

The principal object of the invention is to facilitate the removing and replacement of such an auxiliary weight and to insure its taking up and maintaining its proper position upon the pendulum.

More specifically stated, the object of the invention is to improve the formation of the permanent pendulum weight and of the auxiliary removable weight so as to assist in the placing of the latter in its proper relation to the permanent weight and to insure against any possible shifting of the auxiliary weight such as might disturb the proper operations of the pendulum when augmented as to counter-balancing effect.

With the above stated and incidental objects in view, the invention consists in certain novel features and combinations of parts, the essential elements whereof are recited in the appended claims and a preferred form of embodiment of which is described in detail hereinafter and fully illustrated in the accompanying drawings forming part of this specification.

Of said drawings, Figure 1 represents in front elevation computing scales of the pendulum type having the present invention embodied therein; Fig. 2 represents the permanent and removable pendulum weights in section associated together; Fig. 3 represents the lower end of the pendulum in side elevation without the auxiliary weight, and Fig. 4 represents the auxiliary weight or "ball" in perspective.

Reference may be had to the aforesaid De Vilbiss patent for a detailed description of the construction and mode of operation of the particular type of computing weighing scales to which the invention is shown as applied in the present instance. Brief mention in the present case of certain of the characteristic features of this type of weighing scales will suffice.

The reference numeral 1 designates a suitable supporting base above which is fulcrumed on a suitable standard a scale beam 2 supporting a scale pan 3 and connected within a suitable housing 4 with an index arm 5, which works over a computing chart 6. The fulcrum of said index arm 5 is coincident with the fulcrum of the pendulum, which comprises a rod or stem 7 and a permanent weight secured thereto and taking the form of a disk 8. This disk has a radial slot or opening 9 entering one side and extending around the center of the disk concentric therewith, as shown at 10. The portion of the disk immediately surrounding the said radial opening is substantially V-shaped in cross section or edge view, as shown at 11 in Figs. 1 and 2, although its formation is not continued to a sharp edge but terminates in a narrow, flat surface 12. As the pendulum hangs normally in vertical position, the radial slot or opening 9 extends on an upward inclination as illustrated in Fig. 3, the purpose of which will presently become apparent.

The auxiliary weight or "ball" takes much the form of a dumb-bell, comprising a reduced central portion 13 of substantially the same lateral extent as the flat surface 12 of the permanent weight and two side portions 14 in the form of truncated cones whose angles correspond with those of the V-shaped portions of the permanent weight, as clearly shown in Fig. 2. Beyond these side portions 14 the auxiliary weight is formed with annular flanges 15 designed to take over the sides of the permanent weight beyond the V-shaped portions thereof.

It will now be seen that the above described formations of the permanent and auxiliary weights are calculated to insure a perfectly accurate and correct engagement between them and one which cannot readily be disturbed when once established. The diameter of the central portion 13 of the auxiliary weight coincides substantially with the width of the radial slot or opening 9 in the permanent weight, and the semi-circular inner end of said radial slot or opening provides a seat for the central portion 13 of the auxiliary weight. It will be seen that the V-shaped characteristic of the permanent weight and the conical formation of the auxiliary weight combine to guide the latter to its seat and to maintain it in an unvarying position with relation to the permanent weight. The inclination of the radial slot or opening 9 with reference to the stem of the pendulum serves to prevent any accidental displacement of the auxiliary weight radially of the permanent weight. Furthermore, it will be noted that the construction provides for the disposition of the total weight of the auxiliary device exactly central of the pendulum as to the longitudinal extent of the latter and hence perfect coöperation is insured between the permanent and auxiliary weights in denoting the weight of an article or commodity in the scale pan.

It will be seen that the above described construction provides for removing and replacing the auxiliary weight with great facility and that it is well calculated to thoroughly fulfill the object primarily stated. The construction is, however, susceptible of modification without departing from the spirit and scope of the invention as the same is set forth in the following claims.

What is claimed is:

1. In weighing scales, the combination of a pendulum having a permanent weight, and a removable weight adapted to engage said permanent weight with the centers of mass of the two weights substantially coinciding.

2. In weighing scales, the combination of a pendulum having a permanent weight, with an opening in one edge thereof, and a removable weight adapted to seat in said opening.

3. In weighing scales, the combination of a pendulum having a permanent weight, with a radial opening embracing its center, and a removable weight adapted to seat in said opening.

4. In weighing scales, the combination of a pendulum having a permanent weight, with an inclined radial opening and a removable weight adapted to seat in said opening.

5. In weighing scales, the combination of a pendulum having a permanent weight, with an inclined radial opening embracing its center, and a removable weight adapted to seat in said opening.

6. The combination with the pendulum of weighing scales having a permanent weight with a lateral opening having walls substantially V-shaped in cross-section, of a removable weight having a reduced central portion to enter said opening of the permanent weight and seat in the end thereof, said removable weight flaring at opposite sides of said reduced central portion to conform with the V-shaped cross-section of the permanent weight.

7. In weighing scales, the combination of a pendulum having a permanent weight of disk-form and formed with a radial opening whose boundary walls are substantially V-shaped in cross-section, and a removable weight of double conical formation.

8. In weighing scales, the combination of a pendulum having a permanent weight of disk-form and formed with a radial opening whose boundary walls are substantially V-shaped in cross-section but terminates in a flattened surface, and a removable weight of double frusto-conical formation having a central portion substantially coinciding in length with the width of the said flattened surface of the permanent weight.

9. In weighing scales, the combination of a pendulum having a permanent weight and a removable weight constructed to engage with their horizontal axes substantially coinciding with their engaging surfaces so tapered with respect to said horizontal axis that the removable weight may adjust itself laterally after its initial engagement with said permanent weight and while acquiring its final position.

10. In weighing scales, the combination of a pendulum having a permanent weight, with an opening in one edge thereof, and a removable weight adapted to seat in said opening and take over the sides thereof.

11. In weighing scales, the combination of a pendulum having a permanent weight, with a radial opening embracing its center, and a removable weight adapted to seat in said opening and take over the sides thereof.

12. In weighing scales, the combination of a pendulum having a permanent weight, with an inclined radial opening and a removable weight adapted to seat in said opening and take over the sides thereof.

13. In weighing scales, the combination of a pendulum having a permanent weight, with an inclined radial opening embracing its center, and a removable weight adapted to seat in said opening and take over the sides thereof.

14. In weighing scales, the combination of a pendulum having a permanent weight of disk-form and formed with a radial opening whose boundary walls are substantially V-shaped in cross-section, and a removable weight of double conical formation to engage said radial opening with flanges to take over the sides of the permanent weight.

15. In weighing scales, the combination of a pendulum having a permanent weight of disk-form formed with a radial opening whose boundary walls are substantially V-shaped in cross-section but terminates in a flattened surface, and a removable weight of double frusto-conical formation having a central portion substantially coinciding in length with the width of the said flattened surface of the permanent weight and annular flanges to take over the sides thereof.

16. In weighing scales, the combination of a pendulum comprising a permanent weight having an open-ended slot extending through its center and a removable weight whose center of mass and geometrical center substantially coincide, formed and adapted to be received in said open-ended slot with its center of gravity coinciding with the center of the permanent weight.

MAXIM A. DUQUETTE.

Witnesses:
H. G. CRAWFORD,
H. S. BERGEN.

Copies of this patent may be obtained for five cents each, by addressing the "Commissioner of Patents, Washington, D. C."